United States Patent [19]
Duppong et al.
[11] Patent Number: 4,796,029
[45] Date of Patent: Jan. 3, 1989

[54] TURN TILT TABLE

[75] Inventors: Denis E. Duppong; James R. Dvorsky; David M. Mick; Richard L. Brandt; Leland M. Rieck, all of Cedar Rapids, Iowa

[73] Assignee: FMC Corporation, Chicago, Ill.

[21] Appl. No.: 851,762

[22] Filed: Apr. 14, 1986

[51] Int. Cl.⁴ ..................................... G01S 7/00

[52] U.S. Cl. ..................................... 342/13; 269/58; 269/71; 414/537; 414/678; 414/772

[58] Field of Search ............... 414/469, 480, 482, 537, 414/678, 687, 772; 269/55, 56, 57, 58, 71, 73; 342/13

[56] References Cited

U.S. PATENT DOCUMENTS

| | | | |
|---|---|---|---|
| 1,534,364 | 4/1925 | Diaz | 414/678 X |
| 1,973,803 | 9/1934 | Frauen | 269/58 |
| 2,884,242 | 4/1959 | Fleming | 269/58 X |
| 3,228,546 | 1/1966 | Bunch | 414/537 X |
| 3,536,214 | 10/1970 | Sorg et al. | 414/537 |
| 3,670,903 | 6/1972 | Hamilton | 414/772 |
| 3,931,895 | 1/1976 | Grimaldo | 414/537 X |
| 4,132,323 | 1/1979 | Simmons | 414/482 |
| 4,134,501 | 1/1979 | Tune | 414/678 |

FOREIGN PATENT DOCUMENTS

| | | | |
|---|---|---|---|
| 6715907 | 5/1969 | Netherlands | 414/537 |

OTHER PUBLICATIONS

A brochure entitled General Specification-Hydraulic Crawler Excavator LS-7400A, FMC Corporation.

*Primary Examiner*—Leslie J. Paperner
*Attorney, Agent, or Firm*—Raymond E. Parks; Alan J. Moore; Richard B. Megley

[57] ABSTRACT

The turn tilt table is preferably mounted on a self propelled mobile vehicle for carrying a test article such as a military vehicle weighing up to 70 tons. The mobile vehicle is driven to a plurality of test sites at which radar beams or the like are directed against the test article for determining vehicle radar signatures or the like. During testing, the turn tilt table may be tilted anywhere between a horizontal position and 45° from the horizontal; and may be pivoted 360° about an axis normal to the plane of the turn tilt table to any of a plurality of positions within 360°. If vehicles are being tested, a ramp is connectable to the table to allow the vehicle to be driven onto or off the table.

15 Claims, 8 Drawing Sheets

FIG_6
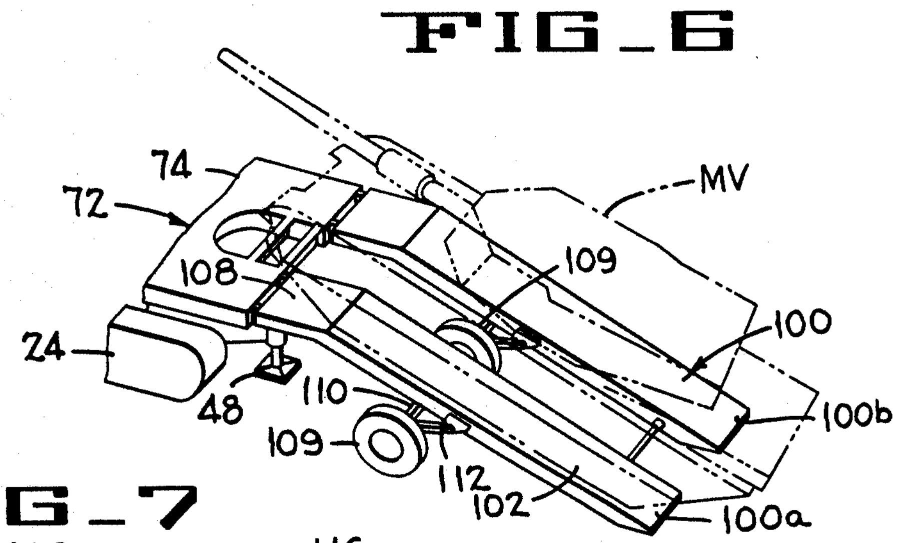
FIG_7
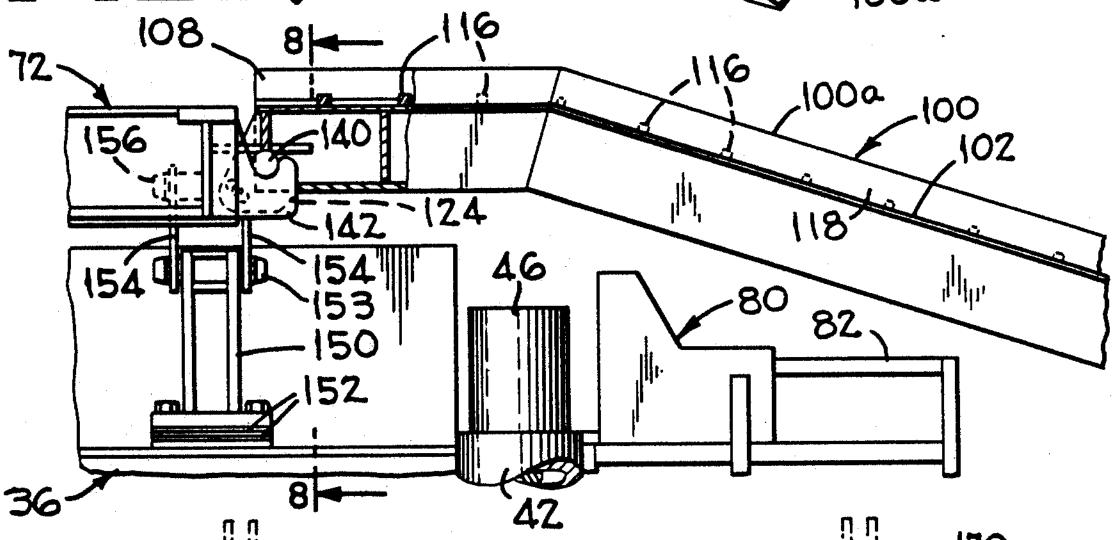
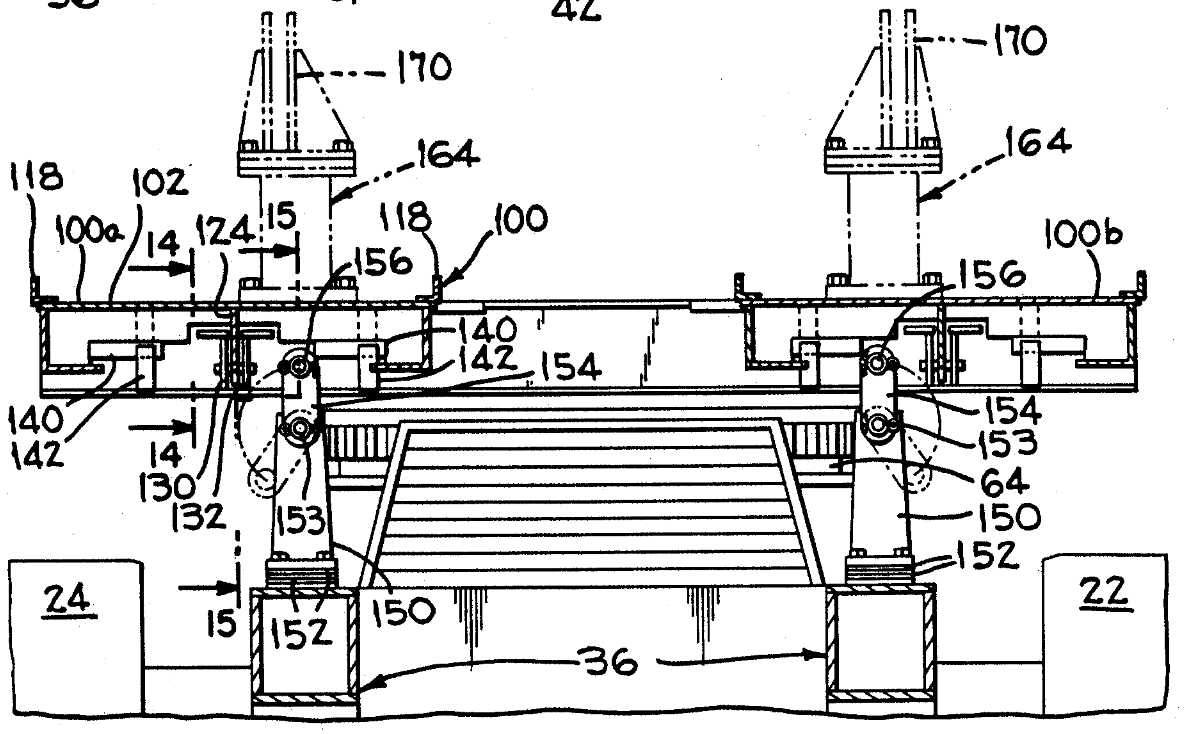
FIG_8

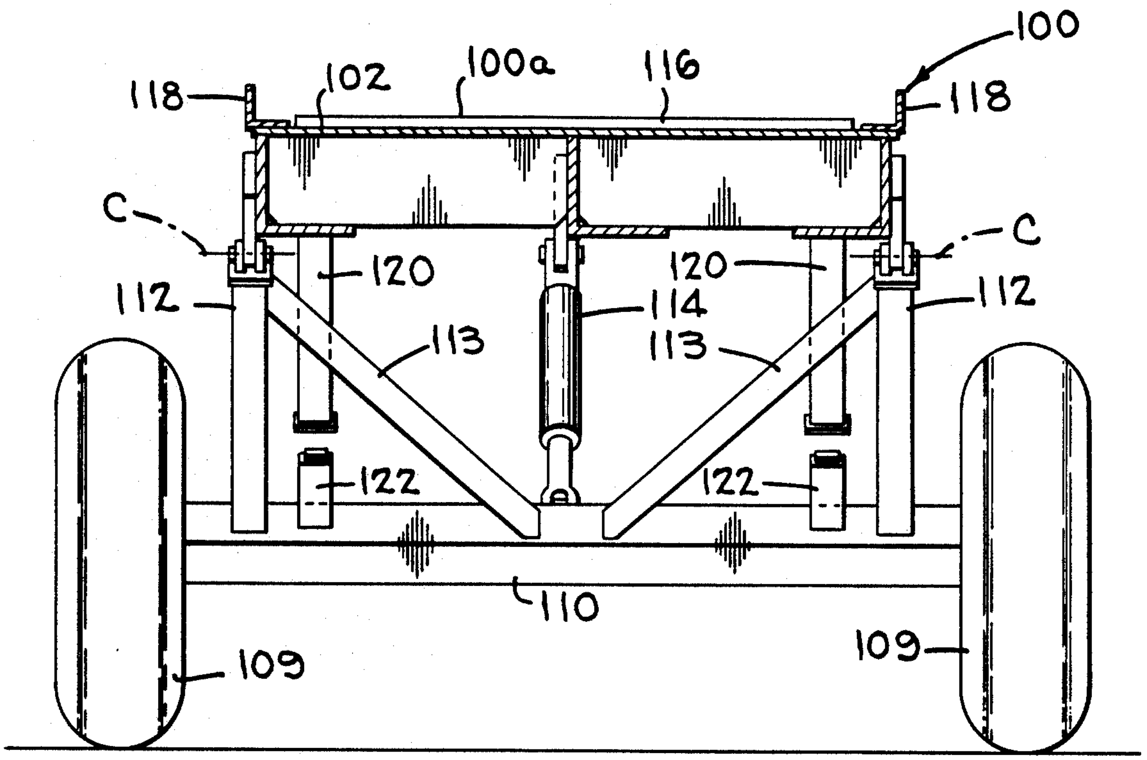
FIG_13
FIG_14
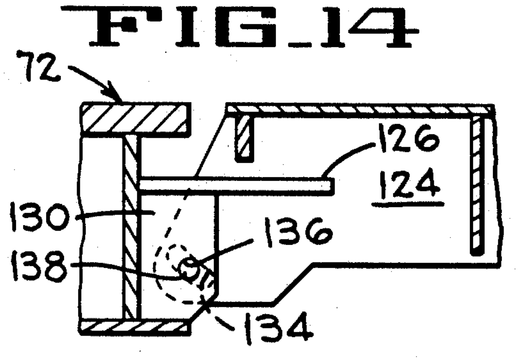
FIG_15
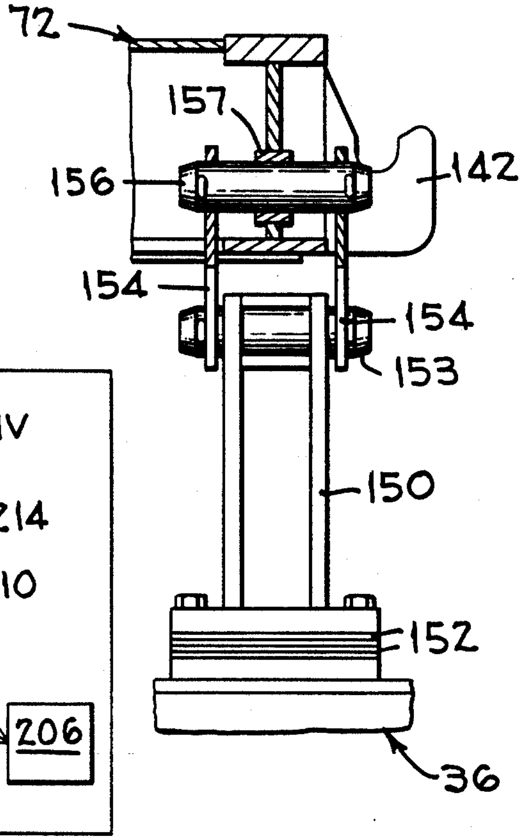
FIG_17
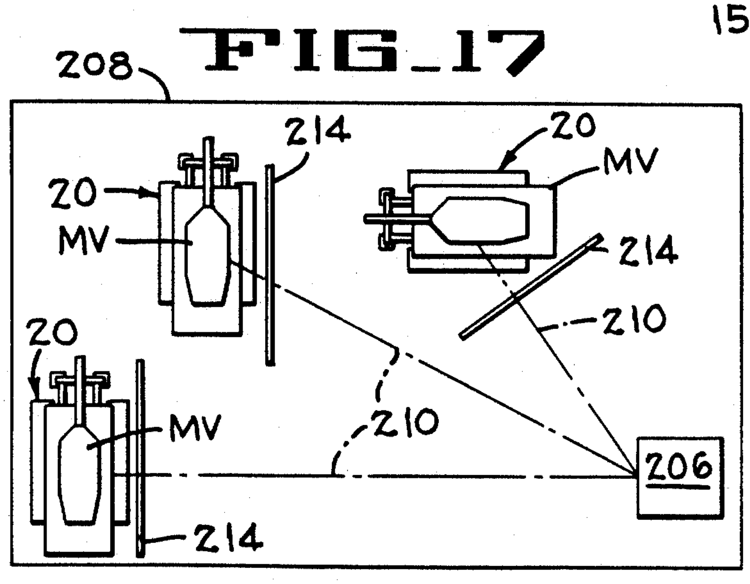

TURN TILT TABLE

BACKGROUND OF THE INVENTION

The present invention relates to a turn tilt table on a self propelled vehicle, and more particularly relates to such a turn tilt table for rotating objects such as a military vehicle through 360° while tilting the military vehicle between a horizontal position and 45° from the horizontal.

SUMMARY OF THE INVENTION

The turn tilt table of the present invention is intended to support a test vehicle (hereinafter termed a military vehicle) weighing up to about 70 tons, and to rotate the table and military vehicle to any of a plurality of positions within 360°, and to tilt the table and military vehicle thereon between a horizontal position and a position that is tilted between 0° and 45° from the horizontal. The turn tilt table with the military vehicle rigidly secured to the table is positioned in a test area including a control tower from which a line of sight to the vehicle may be taken which line of sight includes a radar beam or other beam directed at the test vehicle. The military vehicle is rotated and tilted to present all detectable upright and top surfaces to the beam for the purpose of determining which surface finish or configuration is best to prevent an enemy from detecting the vehicle during combat by radar or the like, or determining the vehicle radar signatures. The turn tilt table vehicle is moved to different locations at the test area so that the effectiveness of the surface finish can be determined at different horizontal and vertical angles from the tower and also at ranges up to at least three kilometers. If the military vehicle being tested is relatively light, such as a one-half ton vehicle or an M113 personnel carrier, the turn tilt table vehicle may be driven to different locations in the test area while carrying the military vehicle at a time when the turn tilt table is in a horizontal position. When a 70 ton tank or the like is being tested, the turn tilt vehicle may carry the military vehicle to different locations in the test area provided the vehicle supporting surface has a density sufficient to support the load. Towable ramps are also provided for connection to the turn tilt table thereby enabling the military vehicle to be driven up the ramps onto the turn tilt table.

BRIEF DESCRIPTION OF THE DRAWINGS

FIG. 6 is a diagrammatic perspective illustrating a military vehicle being driven up a two section towable ramp onto the turn tilt table.

FIG. 7 is an enlarged side elevation illustrating a fragment of the turn tilt table and a portion of the ramp showing the structure for attaching the ramp to the table and further illustrating the structure to prevent the weight of the vehicle from deflecting the table.

FIG. 8 is a section taken along lines 8—8 of FIG. 7 with a pair of hold down beams shown in phantom.

FIG. 13 is an enlarged section taken along lines 13—13 of FIG. 9, illustrating one of two ramp sections supported on two wheels.

FIG. 14 is an enlarged section taken along lines 14—14 of FIG. 8.

FIG. 15 is an enlarged section taken along lines 15—15 of FIG. 8.

FIG. 17 is a plan view illustrating a test field having a tower from which a radar beam or the like is directed at the military vehicle being tested when at several different locations.

DESCRIPTION OF THE PREFERRED EMBODIMENT

Figure 1:
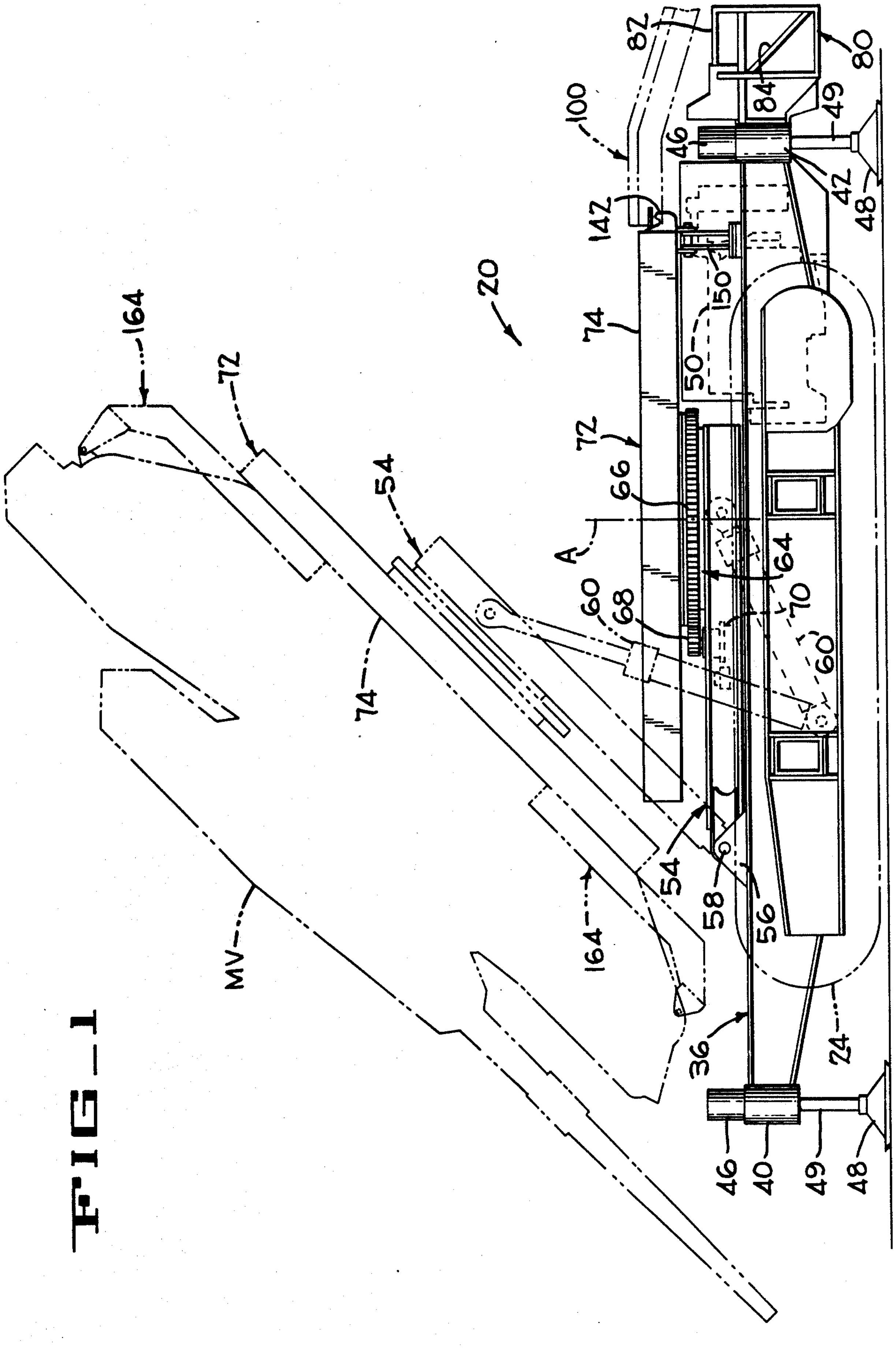
FIG. 1 is a side elevation of the turn tilt table vehicle illustrating the turn tilt table in a horizontal position in solid lines, and tilted 45° with a military vehicle secured thereto in phantom lines.

The turn tilt table vehicle 20 (FIGS. 1, 2, 4 and 5) of the present invention comprises a pair of tread members or tracks 22,24 each having hydraulic motors 26,28 (FIG. 2) for driving the tracks. The tracks are connected to a leveling frame 36 by tubular connectors 34 which may be removed from the leveling frame 36 to reduce the overall width of the leveling frame when the vehicle is broken down into several components for shipment by truck or by rail to different locations.

The leveling frame 36 is rigidly connected to outrigger beams 40,42. Hydraulically actuated jack cylinders 46 having pontoons 48 on the lower ends of piston rods 49 are mounted on the ends of the outrigger beams 40,42 for leveling the frame 36 and components supported thereon when in testing position on the test area. An engine 50 and hydraulic pumps 52 are supported on the leveling frame 36 to provide hydraulic power to the track motors 26,28; to the leveling jack cylinders 46 and to other hydraulic components to be described hereinafter.

A tilting frame 54 is pivotally attached to lugs 56 on the leveling frame 36 by pins 58. The tilting frame is pivoted between a horizontal position and a tilted position of up to about 45° by a pair of hydraulic tilt cylinders 60 that are pivotally connected between the leveling frame 36 and the tilting frame 54 as best shown in FIG. 1. The tilting frame 54 supports a large diameter turntable bearing 64 having an upper rotatable portion 66 with gear teeth on its outer periphery which engage a pinion gear 68 (FIG. 1) driven by a hydraulic motor and reducer 70. When in its horizontal solid line position of FIG. 1, the tilting frame 54 and rotatable portion

Figure 2:
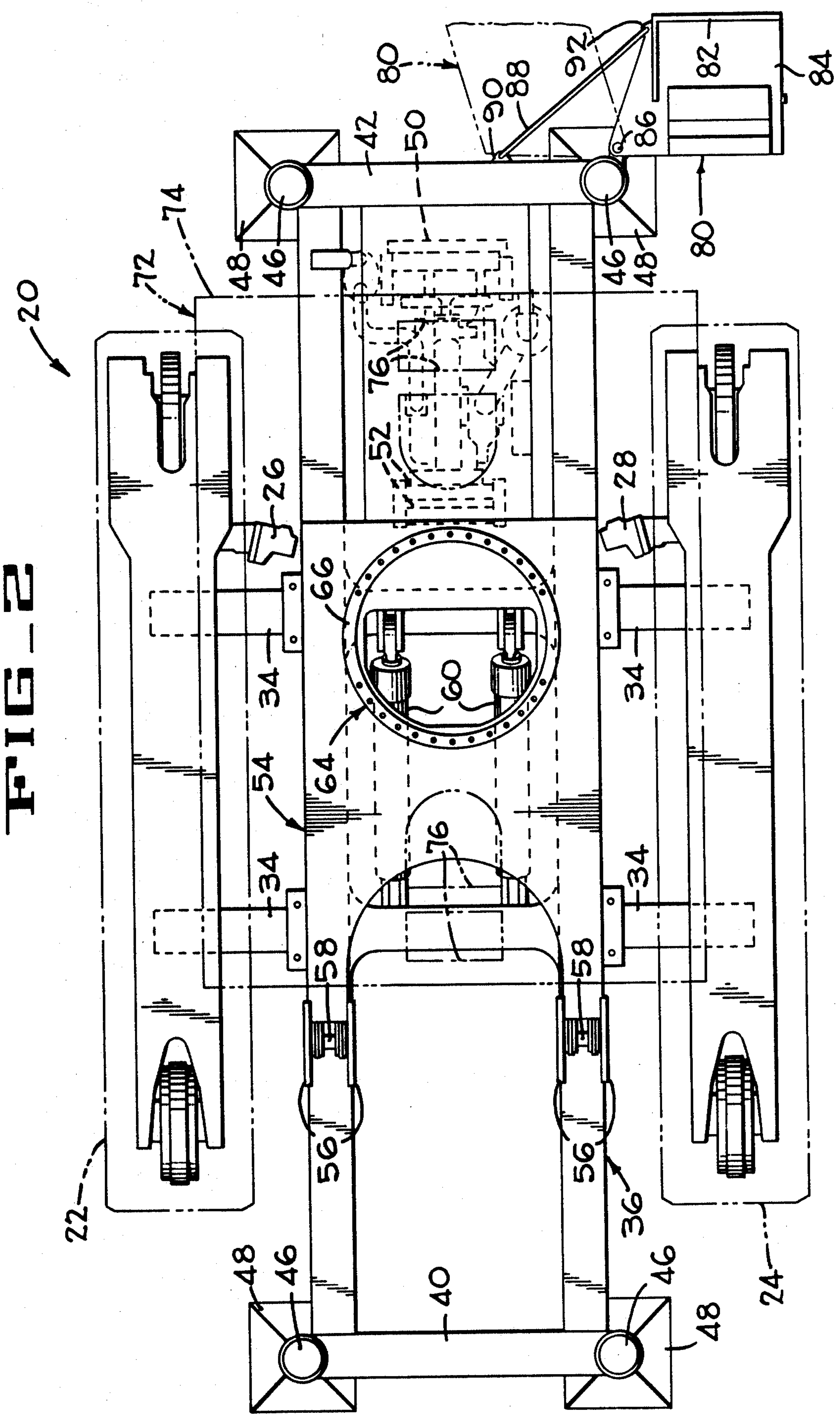
FIG. 2 is a plan of the turn tilt table vehicle with the turn tilt table and the tracks outlined in phantom lines, and other components of the vehicle being shown in dotted lines.

66 of the bearing 64 rotates about a vertical axis A. A rotating platform 72 (FIGS. 1–3) is rigidly secured to the rotatable portion 66 of the turntable bearing 64. The rotating platform 72 includes a track or wheel engaging bed 74 upon which the military vehicle MV to be tested is supported. The bed 74 is secured to a plurality of longitudinally extending beams (not shown) and a plurality of transverse beams 76 (FIG. 1) which support the track or wheel engaging bed 74 upon the upper rotatable portion 66 of the turntable bearing 64. As best shown in FIGS. 1 and 2, an operator station 80 is provided at the rear of the vehicle 20. The operator station includes framework 82 defining an operator's box 84 having an opening on its left side to permit an operator to enter and exit the box. The box 84 is pivotally supported on the rear outrigger beam 42 by a pivot pin 86.

When the vehicle is to be broken down and transported long distances to different locations by truck or by rail, a latching rod 88 is removed from the lugs 90,92 on the outrigger beam 42 and the box 84 allowing the box to be pivoted to the phantom line position in FIG. 2 thus simplifying the break down and transportation procedure. Conventional engine gauges, switches, and controls include; an ignition/starter button, a throttle lever, travel control and emergency shutdown controls mounted at the operator's station 80. Two live-dead switches are provided at the operator's station 80 with the first live-dead switch providing and denying power to hydraulic functions, i.e., swing, tilt, and outrigger jack controls. The second live-dead switch provides or denies power to the travel circuit thus insuring that the vehicle cannot travel during tests or when improperly positioned.

A two section towable mobile loading ramp 100 (FIGS. 6–13) is provided to permit the military vehicle MV being tested to drive up the ramp 100 onto the rotating platform 72 and be parked with the center of gravity of the military vehicle being substantially centered on the vertical axis of rotation A of the rotating platform 72 and tilting frame 54 when horizontal.

Each section 100*a*, 100*b* of the ramp 100 is identical, and is in the form of a relatively narrow two wheel trailer which is independently towed to and connected in its operative position as indicated in FIGS. 9–12. Accordingly, only the ramp section 100*a* will be described in detail.

The ramp section 100*a* comprises an inclined portion 102 having a tongue 103 bolted on its lower end and connected to a towing vehicle 104 by a connector 106. The upper end of the inclined portion is rigidly connected to a generally horizontal portion 108. A pair of wheels 109 (FIG. 13) are journaled on an axle 110, and the axle is rigidly secured to arms 112 that are connected to the inclined portion 102 of the ramp 100*a* for pivotal movement about axis C. The arms 112 are strengthened by diagonal members 113. A hydraulic cylinder 114 is pivotally connected between the axle 110 and the inclined portion 102 and may be controlled to raise or lower the ramp section 100*a* relative to the ground. In order to maintain control of the military vehicle MV when driven up or down the ramp, traction bars 116 (FIG. 7) and angle guide rails 118 are welded to the inclined portion 102 and to the horizontal portion 108 of the ramp section 100*a*.

Figure 10:
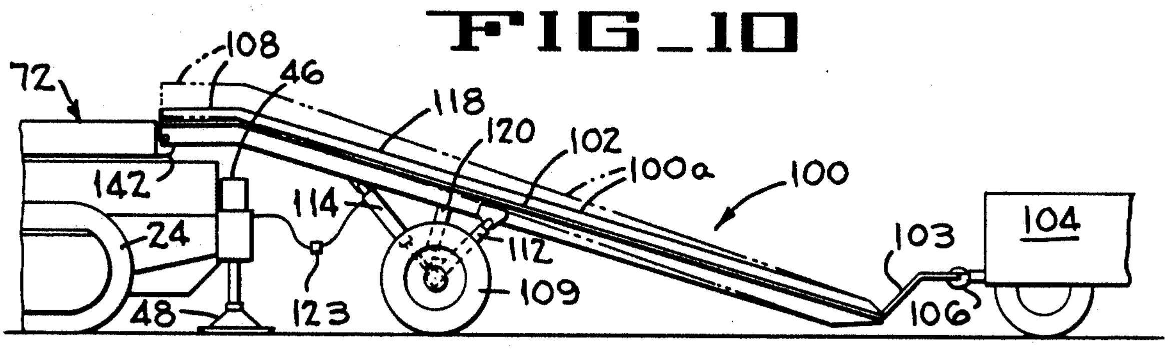
FIG. 10 is an operational view illustrating the upper end of the ramp being hydraulically lowered for pivotal connection to the turn tilt table.
Figure 11:
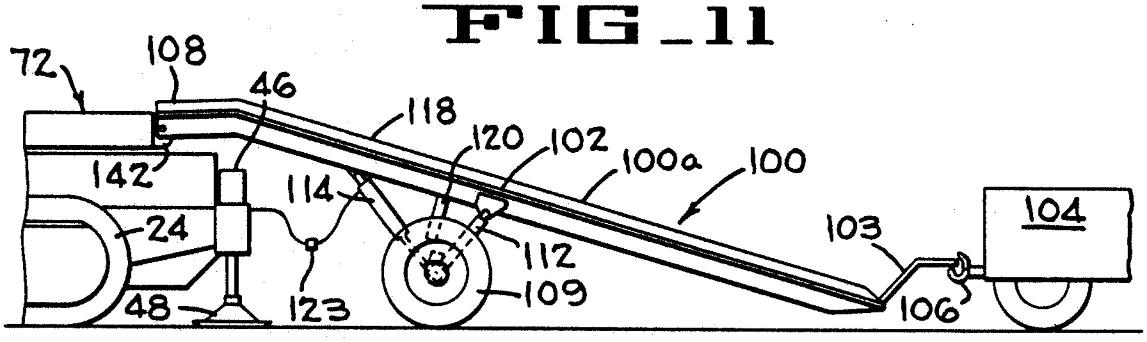
FIG. 11 illustrates the ramp coupled to the rotatable table with its other end hydraulically raised and disconnected from the towing vehicle.
Figure 12:
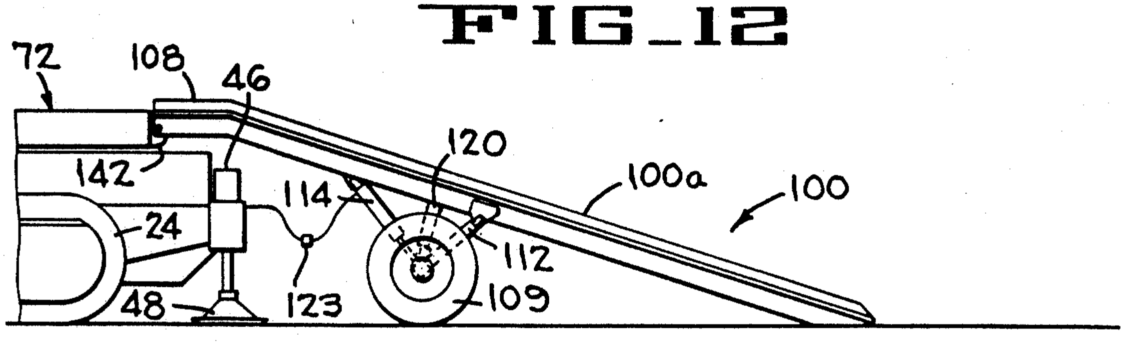
FIG. 12 illustrates the forward end of the ramp supported on the ground with its tongue removed from the ramp and the towing vehicle.

A pair of legs 120 are welded to the inclined portion 102 of the ramp section 100*a* and cooperate with bumpers 122 welded to the axle 110 to support the ramp section 100*a* on the axle when the hydraulic cylinder 114 is fully retracted and is disconnected from its source of hydraulic fluid. As best shown in FIGS. 10–12 the cylinder 114 receives its hydraulic fluid through quick connect conduit 123, connected to the hydraulic circuit nearly centered between rear outrigger jacks 46.

Figure 3:
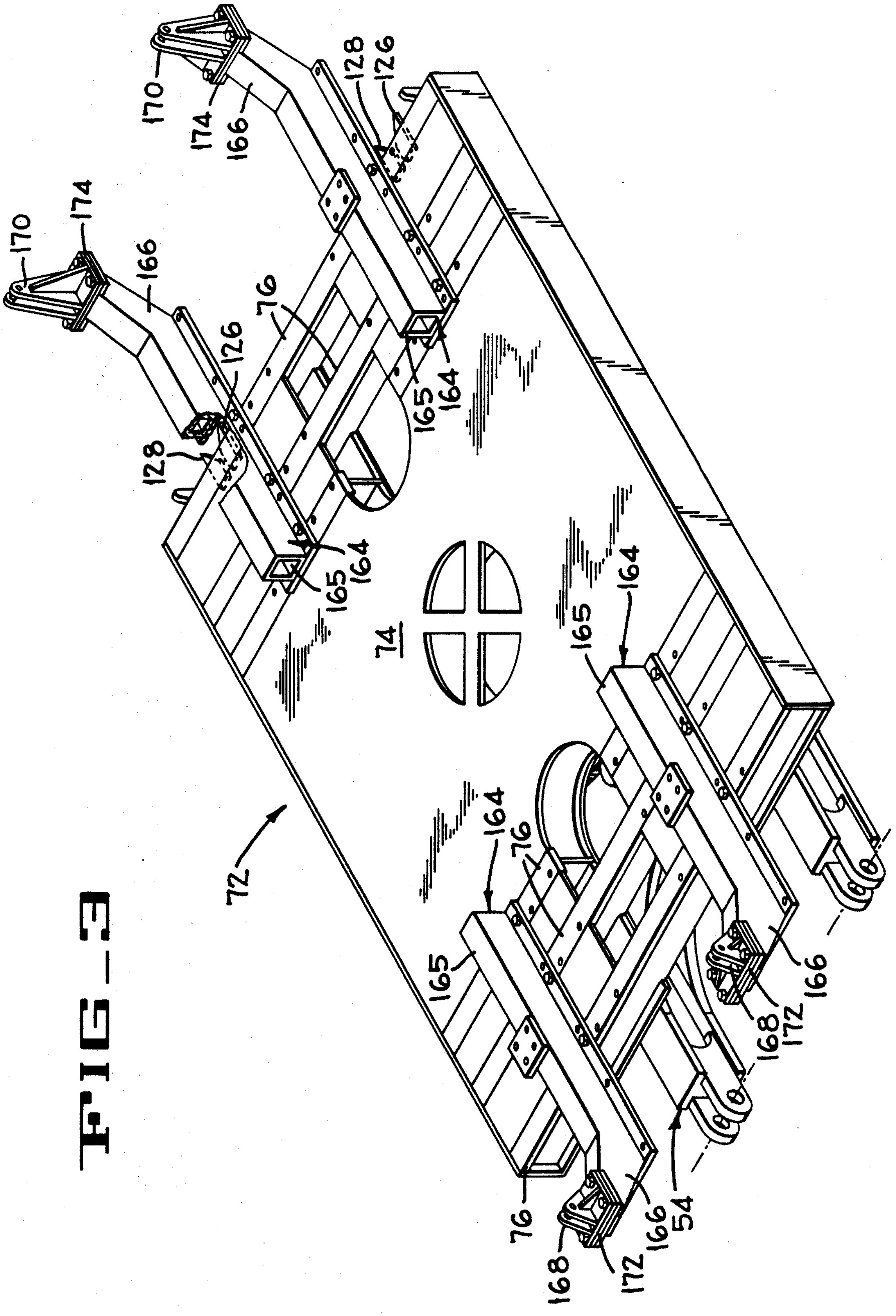
FIG. 3 is a perspective of the turn tilt table in a horizontal position illustrating four hold down beams in position to secure a vehicle to the table.
Figure 4:
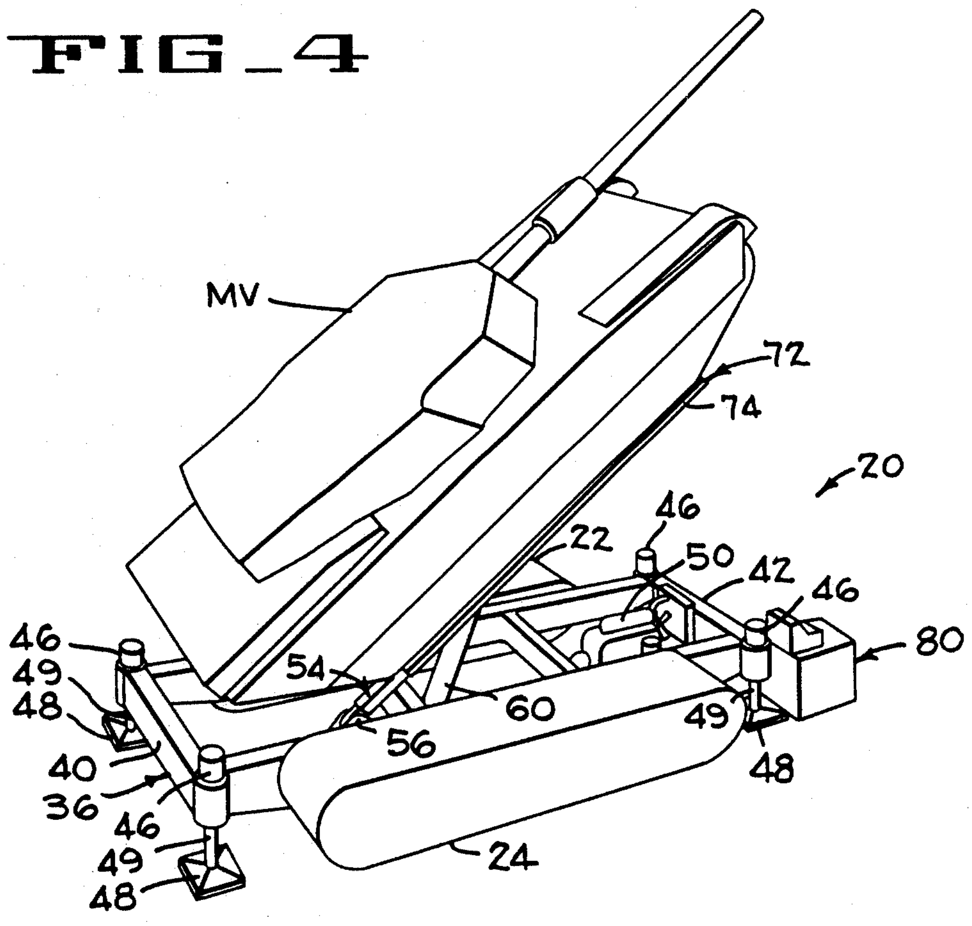
FIG. 4 is a diagrammatic perspective illustrating a military vehicle tilted upwardly about 30°.
Figure 5:
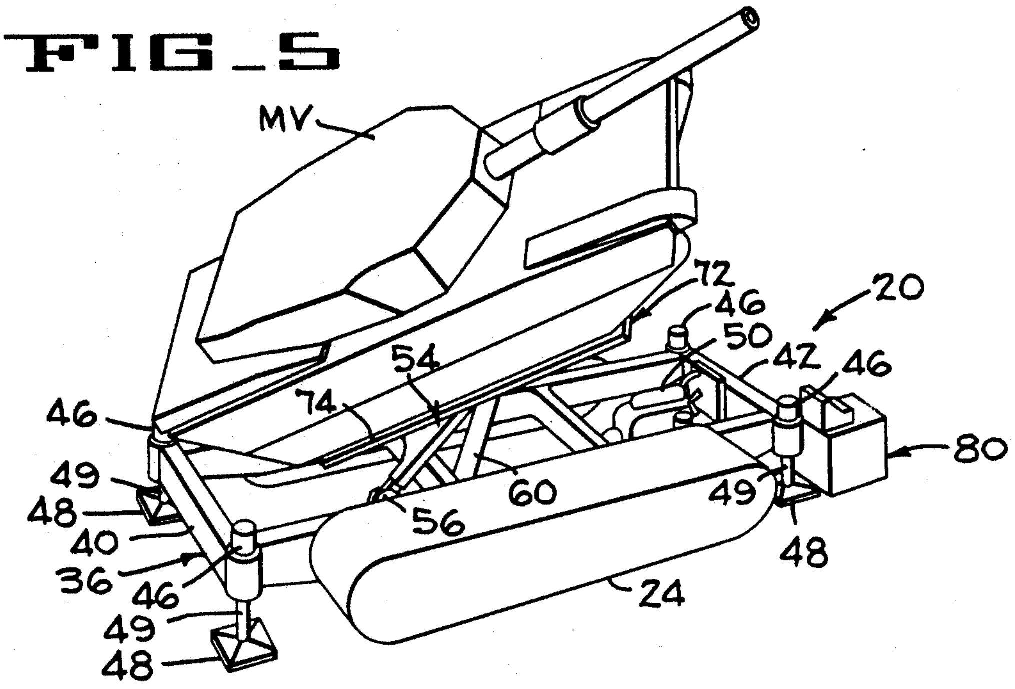
FIG. 5 is a diagrammatic perspective illustrating a military vehicle tilted to about 30° and rotated about 45°.
Figure 9:
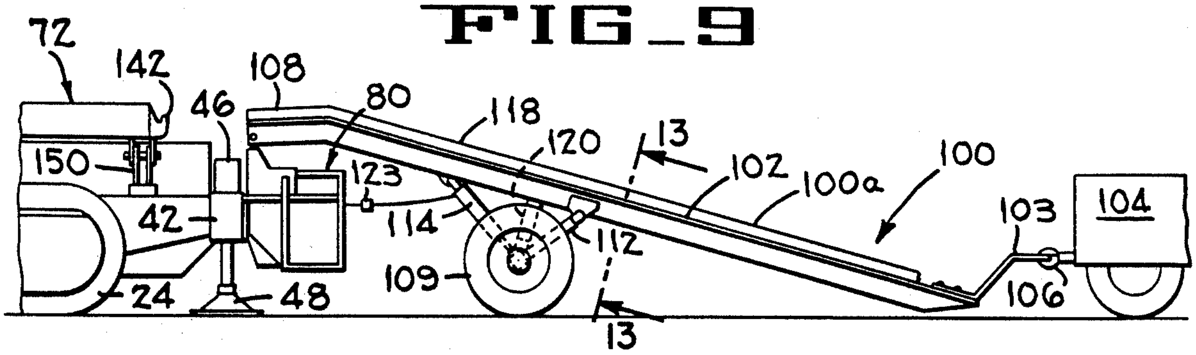
FIG. 9 is an operational view illustrating the towable mobile ramps being pushed into position to be connected to the turn tilt table vehicle, said ramp being connected to a towing vehicle.

In order to connect each of the two sections of the ramp 100 to the rotating platform 72, an associated vertical plate 124 (FIGS. 8 and 14) is welded to and projects downwardly and rearwardly from the horizontal portion 108 and is guided between a pair of spaced V-shaped plates 126,128 (FIG. 3). The spaced plates are welded to the rear wall of the rotating platform 72 and are reinforced by gussets 130,132 having slots 134 therein. A hole 136 in the vertical plate 124 is aligned with the slots 134 when the ramp section 100*a* is in position to be attached to the rotating platform 72 and receives a pin 138 which is held in place by cotter pins or the like.

Having reference to FIGS. 7 and 8, a pair of bars 140 are welded to the rear end of the horizontal portion 108 of the ramp section 100*a* and operatively engage and are supported by a pair of hooks 142 on the rotating platform 72 to transfer the weight of a portion of the ramp section 100*a* and the military vehicle MV thereon to the rear end of the rotating platform 72 when the pin 138 connects the rotating platform to the ramp section 100*a*.

In order to prevent the weight of the military vehicle MV from deflecting the rotating platform 72 downwardly when the vehicle is being driven onto or off the rotating platform, a pair of pedestals 150 (FIGS. 8 and 15) and shims 152 are bolted to the leveling frame 36. The upper end of each pedestal 150 removably receives a pin 153 to which a pair of links 154 are attached and held in place by cotter pins or the like. The upper ends of the links 154 are removably received on a second pin 156 which is slidably received in a collar 157 welded to the rotary platform 72 and is held in place by connectors such as cotter pins. After the military vehicle has been driven onto the rotating platform 72 and its center of gravity is in approximate alignment with the axis A of the bearing 64, pins 156 are removed from the rotating platform 72 and links 154 pivoted downward to a storage position.

As best illustrated in FIGS. 1 and 3, a plurality of hold down arms 164 are bolted to the rotatable platform 72 in appropriate positions to supportively attach the particular type of vehicle being tested to the rotating platform 72.

When handling the illustrated military vehicle MV, each hold down arm 164 includes a sturdy box beam body 165 bolted to the rotating platform 72 and has an upturned end portion 166. Vehicle connecting brackets 168,170 are connected to lugs (not shown) on the vehicle MV as by pinning or bolting. The brackets 168,170 and a required number of shims 172,174 are then bolted to the upturned end portion 166 of the associated hold down arm 164. Secured in this way, the vehicle MV may be turned and tilted to a plurality of positions, including those positions illustrated in FIGS. 1, 4 and 5.

Figure 16:
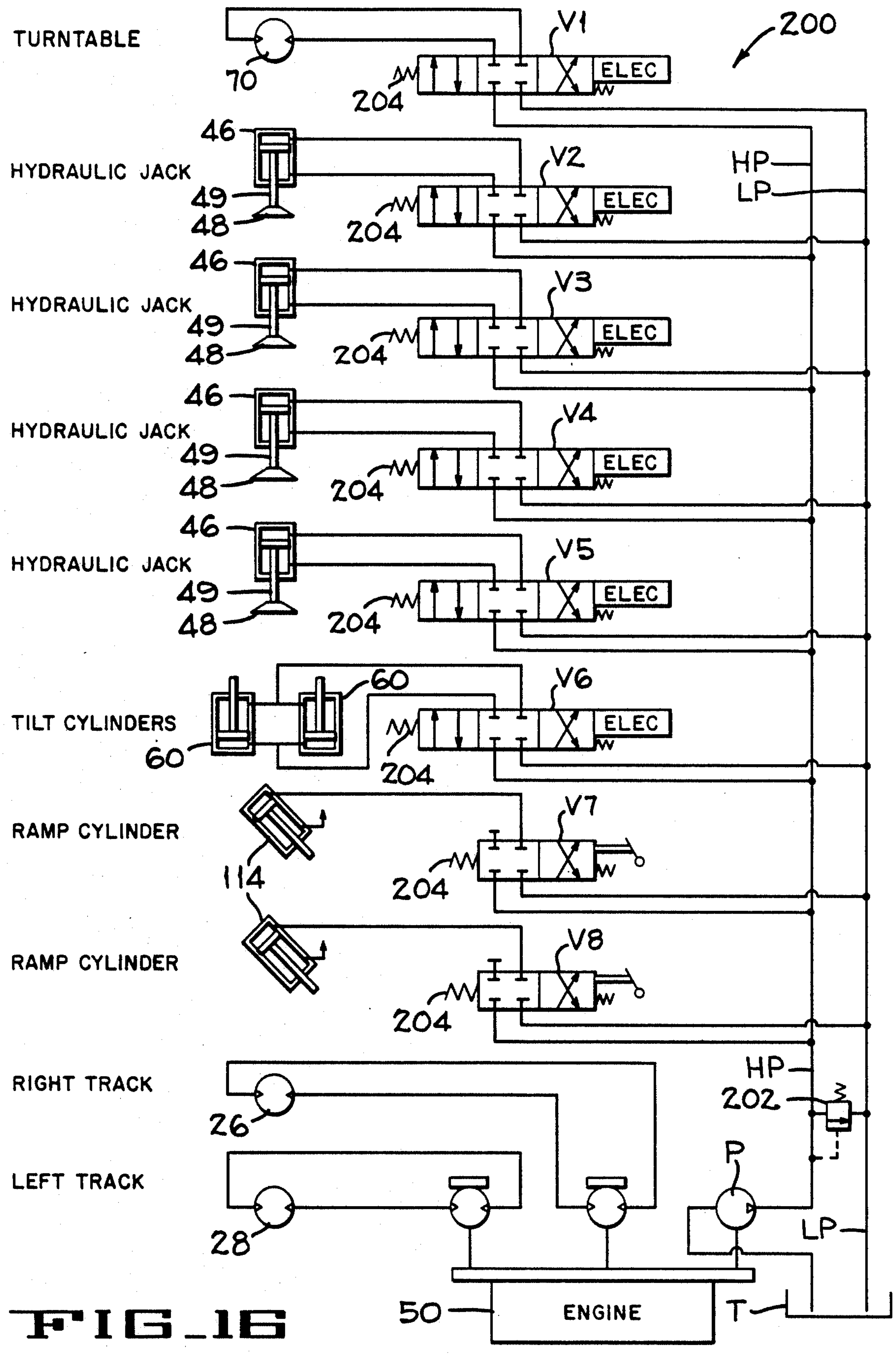
FIG. 16 is a hydraulic diagram illustrating a simplified hydraulic circuit.

The hydraulic components for driving the tracks 22,24 are conventional in the art being the same as that used in Assignee's LS-7400A Crawler Hydraulic Excavator. However, a simplified hydraulic circuit 200 is provided to support the claims, and is illustrated in FIG. 16 as providing means for operating the turn table vehicle 20. It will be understood that certain protective circuits, check valves, and other conventional hydraulic circuitry have been omitted from the illustrated hydraulic circuit for simplicity.

The circuit 200 includes a pump P driven by the engine and gearcase 50 which directs high pressure hydraulic fluid through main conduit HP and returns the fluid to a tank T through low pressure conduit LP. A pilot operated relief valve 202 opens and returns the fluid to tank T in the event the pressure in line HP exceeds a predetermined pressure. A plurality of manually or electrically operated valves V1–V8 are connected to the high pressure and low pressure conduits, and are returned to their illustrated neutral positions by spring 204.

The track drive motors 26 and 28 are preferably hydrostatic motors driven by hydrostatic pumps controlled by an operator with conventional controls. The turntable motor 70 rotates the platform 72 in one direction when the valve V1 is shifted to its parallel passage position, and in the opposite direction when shifted to the cross passage position. When the valve V1 is in its illustrated central position, the motor 70 is hydraulically locked in fixed position The four hydraulic jacks 46 are independently raised when valvs V2–V5 are independently moved to the parallel passage position, and are lowered when the associated valves V2–V5 are moved to the cross passage position. The tilt cylinders 60 are raised when the valve V6 is moved to the parallel passage position and are lowered when the valve V6 is moved to the cross passage position. The two ramp cylinders 114 for the two ramps 100 are independently retraated when the associated valves V7,V8 are in their parallel passage position, and are independently extended when the valves V7,V8 are moved to the cross passage position.

A control tower 206 (FIG. 17) is placed in a test area 208 within which the turn tilt table vehicle 20, with a test object such as the military vehicle MV secured thereto, is driven to a plurality of different test locations. A radar beam 210 or the like is directed from the tower 206 at the test vehicle MV when in said plurality of locations to determine vehicle radar signatures or the like. The test vehicle may be spaced 3 kilometers away from the tower 206 or at any desired position closer to the tower. While at each test position the test vehicle MV may be tilted to any position between horizontal and the 45° position, and may be rotated to any desired position within the 360° range of rotation. In order to shield the turn tilt table vehicle 20 from the beam projected from the tower 206, a shield 214 may be placed between the tower and a major portion of the turn tilt table vehicle 20 thus exposing only the military vehicle to the beam.

From the foregoing description it is apparent that the self propelled turn tilt table vehicle of the present invention is capable of driving to different locations and supporting an article to be tested such as a military vehicle weighing up to about 70 tons. A loading ramp may be connected to the turn tilt table vehicle for allowing a test vehicle to be driven onto or off the turn tilt table vehicle. The turn tilt vehicle is capable of tilting a rotating platform to which the test vehicle is rigidly secured to anywhere between a horizontal position and a position tilting the vehicle up to about 45° from horizontal. While in the horizontal position, or any one of the tilted positions, the rotating platform and the test article or vehicle attached thereto may be rotated through 360° to test the surface finish of the article or vehicle for determining vehicle radar signatures or the like.

Although the best mode contemplated for carrying out the present invention has been herein shown and described, it will be apparent that modification and variation may be made without departing from what is regarded to be the subject matter of the invention.

What is claimed is:

1. A self propelled vehicle in combination with a test stand for moving the test stand to various test locations, comprising drivable ground engaging members supported on a surface;

a leveling frame supported by said ground engaging members;

a tilt frame means pivotally supported on said leveling frame for simulating undulating ground terrain conditions;

a turntable bearing on said tilt frame means and having a rotatable portion thereon for rotation about an axis;

a rotatable platform means rigidly secured to said rotatable portion of said turntable bearing for rotation about said axis for rotating a test combat vehicle mounted to the rotatable platform means for testing effectiveness of electronic surveillance devices for detecting the combat vehicle in various rotated and banked positions downrange from a command post;

means for securing the combat vehicle to said rotatable platform;

power means supported by said self-propelled vehicle for providing power to drive said ground engaging members, for pivoting said tilt frame through a prepdetermined arc, and for rotating said platform about said axis when said tilt frame is positioned anywhere within said predetermined arc; and control means for selectively tilting said tilt frame, for rotating said platform, and for driving said ground engaging members.

2. The self propelled vehicle in combination with the test stand according to claim 1 and additionally comprising outrigger jack means secured to said leveling frame for leveling and maintaining said leveling frame level when said tilt frame is tilted and when said rotatable platform and the combat vehicle secured thereon are rotated about said axis to any position within a 360° arc.

3. The self propelled vehicle in combination with the test stand according to claim 2 wherein said outrigger jack means are hydraulic jacks, wherein said ground engaging members are endless tracks, and wherein said hydraulic jacks support substantially all the weight of said mobile vehicle and said object and raise substantially all of said tracks off of said surface when positioning said leveling frame in its leveling position.

4. The self propelled vehicle in combination with the test stand according to claim 1 wherein said power means includes an engine, a plurality of hydraulic pumps driven by said engine and a plurality of separately controlled hydraulic motors for operating said ground engaging members, for pivoting said tilt frame, and for rotating said platform.

5. The self propelled vehicle in combination with the test stand according to claim 4 wherein said hydraulic motor for rotating said platform includes a swing motor, a speed reducer, and a swing brake.

6. The self propelled vehicle in combination with the test stand according to claim 5 wherein said hydraulic motor for operating said tilt frame includes a pair of hydraulic motor for operating aid tilt frame includes a pair of hydraulic cylinder cases and rods pivotally connected between said leveling frame and said tilt frame.

7. The self propelled vehicle in combination with the test stand according to claim 1 wherein said combat vehicle securing means comprises a plurality of beams, means for securing each beam to said rotatable table in one of a plurality of different positions, and means for attaching said beams to different portions of said combat vehicle for rigidly anchoring said combat vehicle to said rotatable table.

8. The self propelled vehicle in combination with the test stand according to claim 7 wherein said combat vehicle has a plurality of attachment means formed on opposite ends thereof; a plurality of beams, each beam being associated with one of said attachment means and being rigidly connected to said rotatable table, and a plurality of adjustable connector means with each connector means being rigidly connected between associated ones of said beams and attachment means.

9. The self propelled vehicle in combination with the test stand according to claim 1 wherein said ground engaging members are endless tracks.

10. A self propelled test stand for simulating undulating terrain which an armored military vehicle may encounter in combat for testing effectiveness of electronic surveillance devices for detecting test surface finishes on the vehicle at various down range locations while banking and turning the vehicle on the test stand, the self propelled test stand comprising:

a generally rectangular main frame having fore and aft ends and longitudinal sides;

an endless crawler track means extending longitudinally between the fore and aft ends of the main frame;

means for mounting the track means to the longitudinal sides of the main frame and including means for propelling the track means for driving the test stand to selected down range locations;

the test stand including a generally rectangular box shaped sub-frame having fore and aft ends and top and bottom sides, means for pin connecting the fore end of the sub-frame to the main frame, lifting means connected between the main frame and the aft end of the sub-frame for lifting and banking the sub-frame about the pin connecting means, a generally rectangular box-shaped turntable having fore and aft ends and top and bottom sides, means for journally mounting the bottom side of the turntable to the top side of the sub-frame, and, co-operating turning means on the sub-frame and on the turntable for rotating the turntable about the journally mounting means;

an auxiliary mobile ramp means independently moveable into connection with the aft end of the turntable for use in driving the vehicle onto and off of the top side of the turn table;

co-operating latch means on the aft end of the turntable and on an upwardly inclined end of the mobile ramp means for latching the mobile ramp means to the turntable;

pedestal means between the main frame and the bottom side of the aft end of the turntable for preventing deflection of the turntable when the vehicle traverses over the latching means;

securing means mountable at the fore and aft ends of the turntable for securing the vehicle to the top of the turntable;

ground engaging means mounted on the fore and aft ends of the main frame for leveling the test stand at the selected down range selections and for stabilizing the main frame when the mobile ramp means is latched to the turntable for use in driving the vehicle onto and off of the top side of the turntable; and a control station swingable mounted to one corner of the aft end of the main frame, means for swinging the control station outwardly of one longitudinal side of the main frame including means for securing the control station in the swung outwardly position, and means in the control station for independently operating the means for lifting, turning and driving.

11. The self propelled test stand according to claim 10, wherein the lifting means comprise a hydraulic piston and cylinder unit pivotally connected at opposite ends to the main frame and to the fore end of the sub-frame, and the turning means comprise a gear and ring pinion unit co-operatively mounted to the turntable and to the sub-frame, means for driving the gear and ring pinion unit for rotating the turntable to any predetermined angular position between 0° and 360°; and means for activating the piston and cylinder unit for tilting the sub-frame and turn table to any predetermined angular position between 0° and 45° with respect to the horizon.

12. The self propelled test stand according to claim 11, wherein the ground engaging means comprise outboard leveling jacks at each corner of the main frame.

13. The self propelled test stand according to claim 10, wherein the mobile ramp means comprise a pair of laterally spaced apart ramp channels, a cross beam interconnecting upper ends of the channels, an axle and wheel unit connected to the channels by a depending beam, and wherein the cooperating latching means comprise a transversely extending bar mounted to the cross beam member and an upwardly opening hook means mounted on the aft end of the turntable for receiving the bar including means for maintaining the bar nested in the hook means, and, a pair of hydraulic piston and cylinder units on opposite sides of the depending beam pivotally connected at depending ends to opposite sides of the axle and longitudinally spaced apart and pivotally connected at upper ends to the channels, and means for selectively activating the hydraulic piston and cylinder units and rotating the channels about the axle for lowering and for lifting the bar into and out of nesting engagement with the hook means and for lowering and for lifting lower ends of the channels to and above the ground; and means on the lower ends of the channels for connecting the mobile ramp means to a tow vehicle for towing the mobile ramp means in the lifted unlatched upper end and lifted lower end position of the channels.

14. A method for testing surface finishes of a military vehicle mounted on a rotatable table carried on a self propelled vehicle for simulating undulating ground terrain conditions which the military vehicle may encounter in combat for determining which surface finish best prevents an enermy from detecting the military vehicle by electronic surveillance devices at various down range test locations from a command post, comprising the steps of:

moving the self propelled vehicle and the military vehicle mounted on the rotatable table to selected down range test locations from the command post;

tilting the table and military vehicle between any one of a plurality of positions between a horiozntal position and an upwardly inclined position;

rotating the table and military vehicle about an axis normal to said table; and the command post directing an electronic surveillance signal down range toward the selected down range location for trying to detect the military vehicle when rotated and banked on the table in a plurality of tilted and rotated positions.

15. The method according to claim 14 and additionally comprising the steps of attaching a ramp to said rotatable platform when said platform is horizontal, and driving said military vehicle onto said platform with the center of gravity of said military vehicle being positioned to substantially intersect the axis of said rotatable table.

* * * * *